United States Patent
Shibasaki et al.

(10) Patent No.: US 6,352,679 B1
(45) Date of Patent: Mar. 5, 2002

(54) ULTRAFINE PARTICLE SILICON DIOXIDE AND PROCESS FOR PRODUCING THE SAME

(75) Inventors: Takeyoshi Shibasaki; Kazuhisa Konno; Hirokuni Shirono, all of Yokkaichi (JP)

(73) Assignee: Nippon Aerosil Co., Ltd., Tokyo (JP)

( * ) Notice: Subject to any disclaimer, the term of this patent is extended or adjusted under 35 U.S.C. 154(b) by 0 days.

(21) Appl. No.: 09/395,142

(22) Filed: Sep. 14, 1999

(30) Foreign Application Priority Data

Sep. 16, 1998 (JP) .............................. 10-261369

(51) Int. Cl.⁷ ............................................. C01B 33/12
(52) U.S. Cl. ........................................ 423/335; 423/337
(58) Field of Search ................................ 423/335, 337, 423/338, 339

(56) References Cited

U.S. PATENT DOCUMENTS 3,486,913 A    12/1969    Zirngibl et al.
4,067,954 A  * 1/1978    Volling
5,580,655 A  * 12/1996   El-Shall et al.
5,705,137 A  * 1/1998    Goerl et al.

FOREIGN PATENT DOCUMENTS

EP    0706972 A1    7/1996
FR    2451343       3/1980

* cited by examiner

Primary Examiner—Steven P. Griffin
Assistant Examiner—Christina Ildebrando
(74) Attorney, Agent, or Firm—Dennis G. LaPointe; Mason & Associates, PA

(57) ABSTRACT

An ultrafine particle silicon dioxide which comprises silicon dioxide powders in the range of ultrafine particles having a BET specific surface area of 350 $m^2/g$ or more and has a ratio of BET/CTAB specific surface areas of 0.6 to 1.1, a number average of primary particle diameters of 1 to 20 nm, void volume measured with a mercury porosimeter of 0.1 to 1.0 ml/g and linseed oil absorption of 350 to 600 ml/100 g. According to the present invention, the ultrafine particle silicon dioxide can provide various kinds of polymers with excellent mechanical strength and transparency as a filler.

2 Claims, No Drawings

ULTRAFINE PARTICLE SILICON DIOXIDE AND PROCESS FOR PRODUCING THE SAME

BACKGROUND OF THE INVENTION

1. Field of the Invention

The present invention relates to an ultrafine particle silicon dioxide which can be obtained by decomposing a volatile silicon compound at a high temperature under a flame. The ultrafine particle silicon dioxide according to the present invention is useful as a filler for rubbers, resins and the like such as thermosetting silicone rubber or liquid silicone rubber in which transparency and mechanical strength are required, rubber in which especially high transparency is required, and an unsaturated polyester resin for gel coating or an epoxy resin in which high thixotropic properties are required along with transparency.

2. Prior Art

It is known that non-porous silica may be produced by processing a fumed silica dispersed in water with heat at a temperature of 1200° C. or less. However, the thus produced non-porous silica, namely, silica particles, have number average of primary particle diameters of about 3 to 1000 microns and a BET specific surface area of about 1 $m^2/g$ or less. It is difficult to obtain finer silica powders than the above-described silica particles.

As a process for producing fine silica, powders, a process for producing the silica powders having a ratio of BET/CTAB specific surface areas of 0.8 to 1.1 is known (Japanese Patent Application Laid Open No. 172815/1995). However, the process is a so-called wet process using alkali silicate as a raw material. Therefore, a product silica is called as precipitated silica which inevitably contains a trace amount of alkali metal originated in the raw material and shows different characteristics in density of free silanol groups and the like from those of fumed silica so that it is difficult to obtain the similar effects as those of fumed silica when the product silica is employed as a filler or the like for the above-described resin compositions.

Contrary to the aforementioned wet process, a process called as a dry process has long been implemented in which the fine silicon dioxide powders can be produced by hydrolyzing silicon halide under a flame. This process is known advantageous in that a gas which burns while forming water, for example, a mixture composed of hydrogen or methane and oxygen or air is uniformly mixed with silicon halide to be then hydrolyzed under a flame (Japanese Patent Application Publication No. 3359/1961). The ultrafine particle silicon dioxide produced by the above process has a BET specific surface area of about 50 $m^2/g$ to 600 $m^2/g$.

It is generally considered that, when the BET specific surface area is in the range of about 300 $m^2/g$ or less, this value represents the geometrical size of a particle, while, when the BET specific surface area exceeds the above range, a value of the BET specific surface area does not strictly represent the particle size. In other words, in the range where the BET specific surface area exceeds 300 $m^2/g$, the BET specific surface area appears larger due to the effect of pores present at the surface of a primary particle to generate a problem such that the accurate size of the primary particle can not be obtained from the BET specific surface area.

Thus, in the range where the BET specific surface area exceeds 300 $m^2/g$, expected characteristics as the ultrafine particle silicon dioxide can not be obtained. That is to say, even if a conventional fine silica has a BET specific surface area over 300 $m^2/g$, the actual particle size thereof is almost the same as that of the fine silica whose BET specific surface area is 300 $m^2/g$ so that, when the ultrafine particle silicon dioxide power is used as a filler for applications which require mechanical strength, high transparency or high thixotropy, a desired effect can not be obtained in some cases by means of a material design based on the particle size of the conventional BET specific surface area.

SUMMARY OF THE INVENTION

Therefore, it is an object of the present invention to solve the above-described problem of the conventional ultrafine particle silicon dioxide and to provide an ultrafine particle silicon dioxide that is most appropriate as a filler of which excellent mechanical strength and transparency as well as high thixotropy are required.

Namely, the present invention relates to an ultrafine particle silicon dioxide which comprises silicon dioxide powders in the range of ultrafine particles having a BET specific surface area of 350 $m^2/g$ or more and has a ratio of BET/CTAB specific surface areas of 0.6 to 1.1, a number average of primary particle diameters of 1 to 20 nm, void volume measured with a mercury porosimeter of 0.1 to 1.0 ml/g and linseed oil absorption of 350 to 600 ml/100 g.

The present invention includes the ultrafine particle silicon dioxide which comprises a BET specific surface area of 350 to 600 $m^2/g$, CTAB specific surface area of 400 $m^2/g$ or more, a ratio of BET/CTAB specific surface areas of 0.75 to 1.0, a number average of primary particle diameters of 1 to 6 nm and void volume measured with a mercury porosimeter of 0.1 to 0.7 ml/g.

The present invention also relates to a process for producing an ultrafine particle silicon dioxide comprising the steps of:

mixing a volatile silicon compound with a mixed gas including an inflammable gas and oxygen to be a mixture; and decomposing said volatile silicon compound at temperatures as high as 1000 to 2100° C. under a flame generated by burning said mixture, wherein mole equivalents of oxygen and hydrogen in said mixed gas are controlled to be 2.5 to 3.5 and 1.5 to 3.5 respectively against 1 mole equivalent of said volatile silicon compound.

DISCLOSURE OF THE INVENTION

Silicon dioxide (silica) of the present invention comprises ultrafine particle silicon dioxide which has a BET specific surface area of 350 $m^2/g$ or more, a ratio of BET/CTAB specific surface areas of 0.6 to 1.1, a number average of primary particle diameters of 1 to 20 nm, void volume measured with a mercury porosimeter of 0.1 to 1.0 ml/g and linseed oil absorption of 350 to 600 ml/100 g. The term "ultrafine particle" as used herein refers to a particle having a BET specific surface area of 300 $m^2/g$ or more.

In such ultrafine particle silica, the BET and CTAB specific surface areas show a positive interrelation therebetween in the range where the BET specific surface area is 100 to 300 $m^2/g$, whereas the BET and CTAB specific surface areas does not show a linear relation therebetween in the range where the BET specific surface area is over 300 $m^2/g$.

A CTAB method refers to a method which determines a specific surface area by measuring the amount of CTAB (cetyltrimethylammoniun bromide) absorbed by silica particles, while a BET method refers to a method which determines a specific surface area by measuring a nitrogen gas absorbed by silica particles. In the BET method, nitrogen has a small molecular weight so that nitrogen is absorbed in pores present at the surface of the particle, while CTAB has a large molecular weight so that CTAB is not absorbed in pores present at the surface of the particle. Therefore, in the range where the BET specific surface area is 300 $m^2/g$ or more, it is considered that interrelation between the BET and the CTAB specific surface areas is lost due to the fact that the BET specific surface area is increased with the formation of pores at the surface of the primary particle in the above-described range of the BET specific surface area while the CTAB specific surface area is not affected.

The present invention obtains the ratio of BET and CTAB specific surface areas to control the thus obtained ratio to stay in a specified range. Through controlling the ratio to be in a specified range, it became possible to obtain an accurate particle diameter by eliminating the influence of pores formed at the surface of the primary particle.

Thus, silicon dioxide according to the present invention is controlled in the range of a BET specific surface area of 350 $m^2/g$ or more, preferably 350 to 600 $m^2/g$, a ratio of BET/CTAB specific surface areas of 0.6 to 1.1, and preferably 0.75 to 1.0. At the same time, the CTAB specific surface area is preferably 400 $m^2/g$ or more.

When used as a filler, the ultrafine particle silicon dioxide preferably comprises ultrafine powders having a BET specific surface area of 350 $m^2/g$ or more so as to obtain high transparency.

If the ratio of BET/CTAB specific surface areas is in the range of either less than 0.6, or 1.1 or more, the influence of pores at the surface of the primary particle is great so that the particle diameter is not correctly reflected. Though the CTAB specific surface area basically depends on the primary particle diameter of silicon dioxide particle, as shown in Examples described later in the present specification, the CTAB specific surface area is considered to be also related with a coagulated structure of particles. Therefore, an excellent mechanical characteristic can be obtained with addition of fine particles having a CTAB specific surface area of 400 $m^2/g$ or more.

Moreover, the number average of primary particle diameters is in the range of 1 to 20 nm. The smaller the particle diameter becomes, the higher the transparency and the mechanical strength of the polymer become when the particle is dispersed therein; however, the harder the production of ultrafine particles becomes. Therefore, the number average of the primary particle diameters is in the above-described range, preferably in the range of 1 to 6 nm so as to obtain specified characteristics with a practical production method.

The void volume measured by a mercury porosimeter is 0.1 to 1.0 ml/g, preferably 0.1 to 0.7 ml/g. Measurements by the mercury porosimeter correspond to pore volume at the surface of the particle. By decreasing the pore volume down to a specified range, water absorption thereof can be brought to minimum as well as surface activity thereof can be enhanced whereby mechanical strength of a polymer loaded therewith can be enhanced.

In the present invention, the coagulated structure of particles is also important. Specifically, it is a conspicuous characteristic that the linseed oil absorption can be maintained in the range of 350 to 600 ml/100 g. In other words, the linseed oil absorption is closely related with a structure of particles dispersed in a polymer; as the oil absorption goes up higher, the structure of higher grade can be formed whereupon greater reinforcing effect and viscosity increasing performance can be realized. Though the conventional particle with a BET specific surface area of 200 to 380 $m^2/g$ has a linseed oil absorption of 200 to 300 ml/100 g, the present invention was capable of obtaining higher oil absorption than the above range to provide higher mechanical strength to the polymer than that the conventional particle can provide.

Ultrafine particle silicon dioxide according to the present invention can be obtained by a process comprising the steps of: mixing a volatile silicon compound as a raw material with a mixed gas including an inflammable gas and oxygen to be a mixture; providing the thus prepared mixture to a burner; and decomposing the volatile silicon compound at temperatures as high as 1000 to 2100° C. under a flame generated by burning the mixture. If the temperature is less than 1000° C., silicon dioxide (i.e. silica) particles having a large specific surface area can be obtained but aggregation of the particles also proceed which causes the internal surface area thereof to be increased. If the temperature is over 2100° C., which is much higher than the melting point of silica, silica particles grow to be larger owing to the collisions therebetween at a high temperature and therefore the specific surface area thereof decreases.

As the raw material silicon compound, for example, a volatile silicon halide compound is preferable. Specifically, illustrative examples of volatile silicon compounds include $SiH_4$, $SiCl_4$, $CH_3SiCl_3$, $CH_3SiHCl_2$, $HSiCl_3$, $(CH_3)_2SiCl_2$, $(CH_3)_3SiCl$, $(CH_3)_2SiH_2$, $(CH_3)_3SiH$, alkoxysilane groups and the like.

As the mixed gas including the inflammable gas and oxygen, a water forming gas is preferable; gases such as hydrogen, methane, butane and the like are suitable. As a gas including oxygen, oxygen, air or the like can be employed.

The mixing ratio of the volatile silicon compound and the mixed gas is controlled in the range of 2.5 to 3.5 mole equivalents of oxygen and in the range of 1.5 to 3.5 mole equivalents of hydrogen in the mixed gas including oxygen and hydrogen as an inflammable gas on the basis that a mole equivalent of the volatile silicon compound is taken as one mole equivalent. The mole equivalents of oxygen and hydrogen herein described are defined as respective stoichiometrical equivalents thereof in which oxygen and hydrogen react with respective raw material chemical compounds (namely, volatile silicon compounds). In the case where a hydrocarbon fuel such as methane or the like is used, the mole equivalent of the fuel is defined as a converted mole equivalent of hydrogen.

As is apparent from the above definition, the reaction to generate silica basically requires one mole equivalent each of oxygen and hydrogen to one mole equivalent of raw material. However, the present invention uses an excess amount of the former (i.e. oxygen and hydrogen) so as to render the ratio of solid/gas of the reaction mixture smaller, which allows collisions of solid (silica) particles with each other to be decreased thereby controlling the particle growth based on fusion of particles; hence the present invention succeeded in obtaining ultrafine particle silica. When an oxygen content is less than 2.5 mole equivalents, it is difficult to sufficiently control the formation of pores at the surface of the particle which is liable to be affected especially with changes of a hydrogen content. It is preferable to increase the oxygen content from the standpoint of obtaining a finer particle; however, if the oxygen content exceeds 3.5 mole equivalents, size distribution of the silica particles becomes wider and their apparent void volume increases due to the generation of voids among the secondary particles which have been formed by the collisions of the silica particles. On the other hand, if the mole equivalent of hydrogen comes out of the above-described range, the formation of a fine particle or the control of pore formation can not be sufficiently realized, although depending on the kind of the compound (volatile silicon compound) used.

By using the mixed gas including oxygen and hydrogen which are each within the above-defined mole equivalent range, an ultrafine particle silicon dioxide having a BET specific surface area of 350 m$^2$/g or more, a ratio of BET/CTAB specific surface areas of 0.6 to 1.1, a number average of primary particle diameters of 1 to 20 nm, a void volume measured by a mercury porosimeter of 0.1 to 1.0 ml/g and linseed oil absorption of 350 to 600 ml/100 g can be obtained.

BEST MODE FOR CARRYING OUT THE INVENTION

The present invention is described in more detail by reference to the follow examples, but it should be understood that these examples are provided for the purpose of further illustrating the present invention and that the invention is not construed as being limited thereto. Properties of silicon dioxide in each example were measured by the following methods:

1. BET specific surface area: measured with a rapid specific surface area measuring device (Type SAI-100) of Shibata Scientific Instruments Co. Ltd.;
2. Void volume: measured according to the mercury porosimeter method based on German Industry Standard (DIN 66133);
3. CTAB specific surface area: measured with a photoelectric automatic turbidimetric titration device of Atomust Co. Ltd. according to American Society of Testing Materials (ASTM D3324-92, D3765-92);
4. Linseed oil absorption: measured with an oil absorption measuring device type S410B of Frontex Co. Ltd.; and
5. Number average of primary particle diameters: Silica particles were photographed by a transmission electron microscope (LM210 of Philipps Corp.) at a magnification factor of 100,000 and sizes of thousands of primary particles in the photograph were measured. The number average of primary particle diameters ($\overline{D}_N$) was calculated using the following formula:

$$\overline{D}_N = \Sigma(n_i \cdot d_i)\Sigma n_i$$

wherein $d_i$ represents an observed particle size (nm) and $n_i$ represents the number of particles having a size of $d_i$.

EXAMPLE 1

1.0 mole equivalent of SiCl$_4$ as a volatile silica compound was supplied to a burner together with a mixed gas including oxygen and hydrogen (whose mole equivalents are 2.69 and 1.60 respectively) which had been preheated to about 60° C. and burned (at 1600° C.) to generate fine particle silica which is then collected.

The thus collected silica had a number average of primary particle diameters of 5 nm, a BET specific surface area of 380 m$^2$/g, a CTAB specific surface area of 425 m$^2$/g and, accordingly, a ratio of BET/CTAB specific surface areas of 0.89. Void volume measured with a mercury porosimeter and linseed oil absorption thereof were 0.4 ml/g and 382 ml/100 g respectively.

EXAMPLE 2

A fine particle silica was obtained in the same manner as in the Example 1 except that the contents of oxygen and hydrogen in the mixed gas were changed to 3.46 mole equivalents and 1.62 mole equivalents respectively.

The thus obtained silica had a number average of primary particle diameters of 3 nm, a BET specific surface area of 498 m$^2$/g, a CTAB specific surface area of 504 m$^2$/g and, accordingly, a ratio of BET/CTAB specific surface areas of 0.99. Void volume measured with a mercury porosimeter and linseed oil absorption thereof were 0.6 ml/g and 460 ml/100 g respectively.

EXAMPLES 3 AND 4

A fine particle silica was obtained in the same manner as in the Example 1 except that the contents of oxygen and hydrogen in the mixed gas were changed to 2.60 mole equivalents of oxygen and 3.40 mole equivalents of hydrogen in Example 3 and 3.40 mole equivalents of oxygen and 3.50 mole equivalents of hydrogen in Example 4 respectively.

A number average of primary particle diameters, a BET specific surface area, a CTAB specific surface area and, accordingly, a ratio of BET/CTAB specific surface areas, void volume measured with a mercury porosimeter and linseed oil absorption thereof were those as shown in Table 1.

Comparative Example 1

A fine particle silica was obtained in the same manner as in the Example 1 except that the contents of oxygen and hydrogen in the mixed gas were changed to 2.36 mole equivalents and 2.0 mole equivalents respectively.

The thus obtained silica had a number average of primary particle diameters of 8 nm, a BET specific surface area of 395 m$^2$/g, a CTAB specific surface area of 392 m$^2$/g and, accordingly, a ratio of BET/CTAB specific surface areas of 1.01. Void volume measured with a mercury porosimeter and linseed oil absorption thereof were 1.3 ml/g and 320 ml/100 g respectively.

Comparative Example 2

A fine particle silica was obtained in the same manner as in the Example 1 except that the contents of oxygen and hydrogen in the mixed gas were changed to 2.46 mole equivalents and 1.16 mole equivalents respectively.

The thus obtained silica had a number average of primary particle diameters of 8 nm, a BET specific surface area of 500 m$^2$/g, a CTAB specific surface area of 396 m$^2$/g and, accordingly, a ratio of BET/CTAB specific surface areas of 1.26. Void volume measured with a mercury porosimeter and linseed oil absorption thereof were 1.7 ml/g and 318 ml/100 g respectively.

Comparative Example 3

A fine particle silica was obtained in the same manner as in the Example 1 except that the contents of oxygen and hydrogen in the mixed gas were changed to 3.65 mole equivalents and 2.0 mole equivalents respectively.

The thus obtained silica had a number average of primary particle diameters of 6 nm, a BET specific surface area of 483 m$^2$/g, a CTAB specific surface area of 369 m$^2$/g and, accordingly, a ratio of BET/CTAB specific surface areas of 1.31. Void volume measured with a mercury porosimeter and linseed oil absorption thereof were 1.32 ml/g and 336 ml/100 g respectively.

TABLE 1

Characteristics of Fine Particle Silicon Dioxide

|  | Examples | | | | Comp. Ex. | | | Commercial Products*** | | |
| --- | --- | --- | --- | --- | --- | --- | --- | --- | --- | --- |
|  | 1 | 2 | 3 | 4 | 1 | 2 | 3 | AE200 | AE300 | AE380 |
| Mixed Gas Oxygen* | 2.69 | 3.46 | 2.60 | 3.40 | 2.36 | 2.46 | 3.65 | — | — | — |
| Hydrogen* | 1.60 | 1.62 | 3.50 | 3.50 | 2.0 | 1.16 | 2.0 |  |  |  |
| BET (m$^2$/g) | 380 | 498 | 396 | 537 | 395 | 500 | 483 | 202 | 298 | 378 |
| CTAB (m$^2$/g) | 425 | 504 | 465 | 688 | 392 | 396 | 369 | 310 | 375 | 366 |
| BET/CTAB | 0.89 | 0.99 | 0.85 | 0.78 | 1.01 | 1.26 | 1.31 | 0.65 | 0.79 | 1.03 |
| Particle Size(nm) | 5 | 3 | 5 | 2 | 8 | 8 | 6 | 12 | 8 | 9 |
| Void Volume** (ml/g) | 0.4 | 0.6 | 0.2 | 0.4 | 1.3 | 1.26 | 1.32 | 0.3 | 0.4 | 1.2 |
| Oil Absorption (ml/100 g) | 382 | 460 | 412 | 578 | 320 | 318 | 336 | 220 | 292 | 298 |

NOTES
*mole equivalent of oxygen and hydrogen in the mixed gas
**Void volume measured with mercury porosimeter
***AE200, AE300, AE380: Aerosil 200, Aerosil 300, Aerosil 380

Polymer Characteristics

Silicone rubber was loaded with each of silica fine powders of Examples 1 to 4, Comparative Examples 1 to 3 and commercial products (Aerosil 200, 300 and 380 by trade name of Nippon Aerosil Co. Ltd.) to prepare a plurality of the thus loaded silicone rubber which were then each evaluated of reinforcing effect and transparency thereof. As silicone rubber, a silicone polymer (an experimental product under the trade name of Siloprene VS of Bayer Ltd.) which has a vinyl group therein was employed. 100 parts (unless otherwise indicated, all parts, percentages, ratios and the like being by weight) of the above-described silicone rubber was loaded with 40 parts each of the above-described silica powders and 7.6 parts of dimethylpolysiloxane having terminal hydroxyl groups at both ends thereof and was mixed with a kneader at an ordinary temperature to obtain a plurality of uniform mixtures which were then heated to 150° C. and, thereafter, blended for another one hour. After being cooled down, each of the thus formed mixtures was added with 1% of 2,4-dichlorobenzoylperoxide (50% silicone oil) and was mixed with a two-roll mill. Then, each mixture was vulcanized under pressure for 10 minutes at 120° C. and was, thereafter, processed to be a sheet having a thickness of 2 mm which was then subjected to measurements of transparency and mechanical strength thereof. The transparency was evaluated on the basis of transmittance which was obtained by irradiating the thus prepared sheet with a red light (700 nm) and measured with a spectrophotometer type V-570 of JASCO Corp.

TABLE 2

Evaluation of Silicone Rubber

|  | Examples | | | | Comp. Examples | | | Commercial Products | | |
| --- | --- | --- | --- | --- | --- | --- | --- | --- | --- | --- |
|  | 1 | 2 | 3 | 4 | 1 | 2 | 3 | AE200 | AE300 | AE380 |
| Hardness | 58 | 70 | 66 | 76 | 51 | 53 | 56 | 46 | 50 | 47 |
| Elongation (%) | 472 | 420 | 431 | 368 | 425 | 430 | 425 | 580 | 432 | 462 |
| Tensile Strength (kgf/cm$^2$) | 103.1 | 105.2 | 104.0 | 112.9 | 94.6 | 90.0 | 98.2 | 69.2 | 74.1 | 89.9 |
| Tear Strength (kgf/cm) | 18.4 | 24.6 | 22.6 | 33.4 | 11.6 | 15.0 | 16.2 | 7.1 | 8.0 | 16.9 |
| Transmittance (%) | 74.6 | 82.3 | 80.2 | 90.1 | 70.5 | 70.0 | 72.5 | 62.4 | 68.0 | 71.5 |

NOTE: Each of the rubber sheet samples having a thickness of 2 mm was measured at 700 nm with a spectrophotometer JASCO V-570.

Characteristics of silica obtained in the above-described Examples and Comparative Examples are shown in Table 1. For a comparison purpose, characteristics of commercial silica were also shown. Evaluation results of silicone rubber loaded with each of above-described silicas were shown in Table 2. As is apparent from these results, silica powders in Examples 1 to 4 which were each obtained by controlling mole equivalents of oxygen and hydrogen in the mixed gas have all targeted values on all items of the specific surface areas, the average particle diameter and the oil absorption. The silicone rubber which was loaded with each of these silica powders shows high transmittance (74.6 to 90.1 %) and substantially large tensile strength and tear strength. On the other hand, the silicone rubber which was loaded with each of Comparative Examples 1 and 2 and the commercial silica powders which did not have desired physical properties shows lower transmittance and mechanical strength than any of those loaded with Examples.

The ultrafine particle silicon dioxide according to the present invention is most appropriate as a filler for various kinds of resin compositions which require transparency and mechanical strength such as various kinds of silicone rubber, various kinds of unsaturated polyester resins, epoxy resin adhesives and the like thereby providing excellent mechanical strength and transparency as well as high thixotropy thereto.

The foregoing description is of preferred embodiments of the present invention. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalent thereof.

What is claimed is:

1. An ultrafine particle silicon dioxide comprising:

silicon dioxide powders in the range of ultrafine particles having a BET specific surface area in the range of 350 $m^2/g$ to 600 $m^2/g$, a CTAB specific surface area greater than 400 $m^2/g$, a ratio of BET/CTAB specific surface areas in the range of 0.6 to 1.1, a number average of primary particle diameters in the range of 1 to 20 nm, a void volume measured with a mercury porosimeter in the range of 0.1 to 1.0 ml/g, and a linseed oil absorption in the range of 350 to 600 ml/100 g, wherein the ultrafine particle silicon dioxide is prepared by the steps of:

mixing a volatile silicon compound with a mixed gas including an inflammable gas and oxygen to be a mixture; and decomposing said volatile silicon compound at temperatures between approximately 1000° C. to 2100° C. under a flame generated by burning said mixture, wherein mole equivalents of oxygen and hydrogen in said mixed gas are controlled to be 2.5 to 3.5 and 1.5 to 3.5 respectively against 1 mole equivalent of said volatile silicon compound wherein the ultrafine particle silicon dioxide comprises silicon dioxide powders in the range of ultrafine particles having a BET specific surface area of 350 $m^2/g$ to 600 $m^2/g$, has a CTAB specific surface area of greater than 400 $m^2/g$, and has a ratio of BET/CTAB specific surface areas of 0.6 to 1.1, a number average of primary particle diameters of 1 to 20 nm, void volume measured with a mercury porosimeter of 0.1 to 1.0 ml/g and linseed oil absorption of 350 to 600 ml/100 g.

2. The ultrafine particle silicon dioxide according to claim 1, wherein the ratio of BET/CTAB specific surface areas is in the range of 0.75 to 1.0, the number average of primary particle diameters is in the range of 1 to 6 nm, and the void volume measured with a mercury porosimeter is in the range of 0.1 to 0.7 ml/g.

* * * * *

UNITED STATES PATENT AND TRADEMARK OFFICE
CERTIFICATE OF CORRECTION

PATENT NO. : 6,352,679 B1
DATED : March 5, 2002
INVENTOR(S) : Takeyoshi Shibasaki et al.

It is certified that error appears in the above-identified patent and that said Letters Patent is hereby corrected as shown below:

Column 10,
Lines 19-27, delete "wherein the ultrafine particle silicon dioxide comprises silicon dioxide powders in the range of ultrafine particles having a BET specific surface area of 350 $m^2g$ to 600$m^2$/g, has a CTAB specific surface area of greater than 400 $m^2g$, and has a ratio of BET/CTAB specific surface areas of 0.6 to 1.1, a number average of primary particle diameters of 1 to 20 nm, void volume measured with a mercury porosimeter of 0.1 to 1.0 ml/g, and linseed oil absorption in the range of 350 to 600 ml/100 g."

Signed and Sealed this

Tenth Day of September, 2002

*Attest:*

*Attesting Officer*

JAMES E. ROGAN
*Director of the United States Patent and Trademark Office*